(12) United States Patent
Liu et al.

(10) Patent No.: US 6,593,988 B1
(45) Date of Patent: Jul. 15, 2003

(54) MULTI-DOMAIN LIQUID CRYSTAL DISPLAY WITH WALL-BUMP STRUCTURES IN PIXEL AREA

(75) Inventors: Hong-Da Liu, Juipei (TW); Ing-Jer Lin, Juipei (TW); Ching-Her Chao, Juipei (TW); Dai-Liang Ting, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/522,137

(22) Filed: Mar. 9, 2000

(30) Foreign Application Priority Data

Dec. 27, 1999 (TW) .......................................... 88123000 A

(51) Int. Cl.$^7$ ............................................. G02F 1/1337
(52) U.S. Cl. ........................ 349/129; 349/160; 349/191
(58) Field of Search ................................ 349/129, 156, 349/160, 191

(56) References Cited

U.S. PATENT DOCUMENTS

| | | | | |
|---|---|---|---|---|
| 5,309,264 A | | 5/1994 | Lien et al. | |
| 5,907,380 A | * | 5/1999 | Lien | 349/141 |
| 6,061,117 A | * | 5/2000 | Horie et al. | 349/156 |
| 6,256,080 B1 | * | 7/2001 | Colgan et al. | 349/129 |
| 6,313,899 B1 | * | 11/2001 | Wu et al. | 349/130 |
| 6,335,771 B1 | * | 1/2002 | Hiraishi | 349/42 |
| 6,356,335 B1 | * | 3/2002 | Kim et al. | 349/156 |
| 6,400,440 B1 | * | 6/2002 | Colgan et al. | 349/160 |
| 6,466,293 B1 | * | 10/2002 | Suzuki et al. | 349/144 |

* cited by examiner

*Primary Examiner*—Robert H. Kim
*Assistant Examiner*—Andrew Schechter

(57) ABSTRACT

A multi-domain liquid crystal display (LCD) has a plurality of wall-bump structures formed on a common electrode layer on a substrate. Each wall-bump structure consists of at least one wall-bump disposed in a pixel area. Wall-bumps of many different shapes can be used in the wall-bump structure. The wall-bump structure is manufactured by a standard photo-lithographic process. It provides pre-tilted angles for liquid crystal molecules and results in orderly alignment of liquid crystal molecules when an external voltage is applied. By means of the fringe field effect to tilt liquid crystal molecules, a multi-domain LCD cell can be established after a voltage is applied. The multi-domain LCD provides fast response speed for its application and higher transmittance than a conventional vertically aligned wide-viewing angle LCD.

7 Claims, 23 Drawing Sheets

MULTI-DOMAIN LIQUID CRYSTAL DISPLAY WITH WALL-BUMP STRUCTURES IN PIXEL AREA

FIELD OF THE INVENTION

The present invention relates generally to a structure of a multi-domain liquid crystal display (MD-LCD), and more specifically to a structure of a multi-domain liquid crystal display with a wall-bump structure located around the central portion of a pixel.

BACKGROUND OF THE INVENTION

The market for liquid crystal display (LCD) panels is increasing rapidly, especially in their applications to notebook PCs and monitors. When LCD panels of larger size and higher resolution are used for desktop monitors, navigation displays in cars, wall TVs and High-Definition TVs (HDTV), wide-viewing angles (WVA) and fast response time become very critical in meeting the monitors' requirements. In addition to contrast ratio with respect to different viewing angles, gray-scale inversion, colorimetry, and the optical response of a LCD are important features of a high quality LCD panels. However, the cost associated with designing and manufacturing a panel also needs to be considered.

Controlling liquid crystal domains is the most important technology in obtaining a wide-viewing angle for a vertically aligned LCD. Most of the conventional LCDs are 90° twisted nematic (TN) LCD's having a LCD panel and crossed polarizers attached outside. The drawbacks of the conventional LCDs include narrow viewing angles (±40° horizontally and ±30° vertically), slow response (about 50 ms), and large color dispersion. Therefore, it is difficult to make high quality LCD panels. Also, the rubbing process required in manufacturing the panels causes electric static damage (ESD) and particle pollution.

Because of the demand in high quality LCD panels with wide-viewing angles, the structure of multi-domain LCDs has been developed. Each pixel is divided into several domains to compensate for the asymmetry in optics so as to increase the viewing angle of the display panel. Such LCD panels have compensation films and crossed polarizers outside the liquid crystal display panel. The liquid crystal mode is multi-domain vertically aligned. A multi-domain LCD panel has a wide-viewing angle and small color dispersion. In addition, it does not have electric static damage and particle pollution problems because no rubbing process is required.

U.S. Pat. No. 5,309,264 discloses a structure of a multi-domain liquid crystal display. It uses a common electrode having a pattern of openings thereon to cause the liquid crystal molecules to be divided into multiple domains. Therefore, the display element comprises multi-domains. The characteristics of the domains are determined by the shape of the patterns on the electrodes. The shape of the patterns of openings in the electrodes may be "+", "X", "double-Y", "triple-X", "dual double-Y", "diagonal slot", "horizontal slot" or "vertical slot". FIG. 1(a) to FIG. 1(i) show some patterns of the openings in the electrodes. The pixels shown in FIG. 1(a) to FIG. 1(c) are of equal width and length while those shown in FIG. 1(d) to FIG. 1(i) typically have a 1:3 aspect ratio.

FIG. 2 shows a conventional bump structure of a multi-domain LCD. The W-shaped bump structures are formed on both upper and lower substrates. Although the rubbing process has been eliminated in manufacturing these LCD panels, complicated manufacturing steps are required. For example, it is necessary to form bump structures on both upper and lower substrates.

SUMMARY OF THE INVENTION

The primary object of the present invention is to provide a structure of a multi-domain liquid crystal display with wall-bump structures located at the central portion of a pixel and formed on a substrate of a color filter or thin film transistors (TFT).

According to the invention, the wall-bump structure provides pre-tilted angles for liquid crystal molecules and results in orderly alignment of the liquid crystal molecules to form multi-domain textures when an external voltage is applied. Also, the ratio of the light intensity in horizontal and vertical directions can be controlled by adjusting the position of the wall-bump structure.

In the preferred embodiments of a multi-domain liquid crystal display of the present invention, the wall-bump structure on an electrode may be formed by a combination of wall-bumps of different shapes. For a pixel with equal width and length, its wall-bump structure may be quasi-square or circular. Otherwise, it may be a combination of multiple quasi-square shaped wall-bumps and slot shaped wall-bumps, a combination of multiple circular shaped wall-bumps and slot shaped wall-bumps, a T-inverse- T shaped wall-bump, a combination of multiple T-inverse- T shaped wall-bumps and slot shaped wall-bumps, a V-inverse- V shaped wall-bump or a combination of multiple V shaped wall-bumps and inverse- V shaped wall-bumps.

In the present invention, standard photo-lithographic process is used to manufacture the wall-bump structure on common electrodes. The wall-bump structures is located at the central portion of each pixel. The electrodes on a substrate produce lateral fringe fields parallel to a substrate. This fringe field effect causes liquid crystal molecules to be tilted along a plane parallel to the substrate, and therefore establishes a multi-domain LCD cell. Furthermore, the ratios among the sizes of different domains can be adjusted by adjusting the position of the wall-bump structure. No rubbing treatment is needed in manufacturing the liquid crystal displays. The manufacturing process is greatly simplified and has the advantages of being fast, simple, clean and pollution free.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
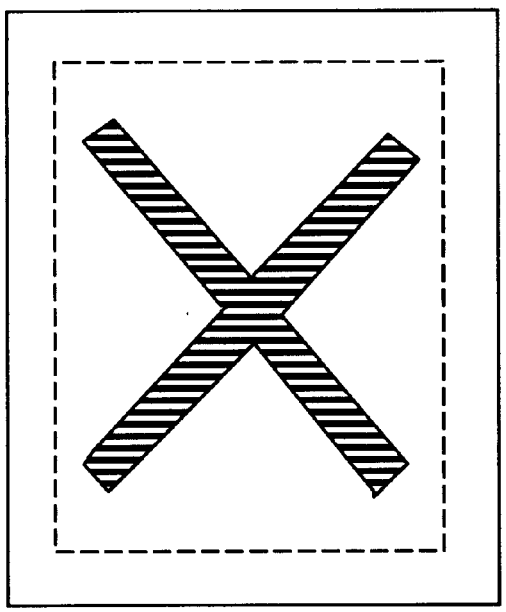
FIGS. 1(a)–(i) show some structures of openings in the electrodes of a conventional multi-domain LCD.
Figure 1:
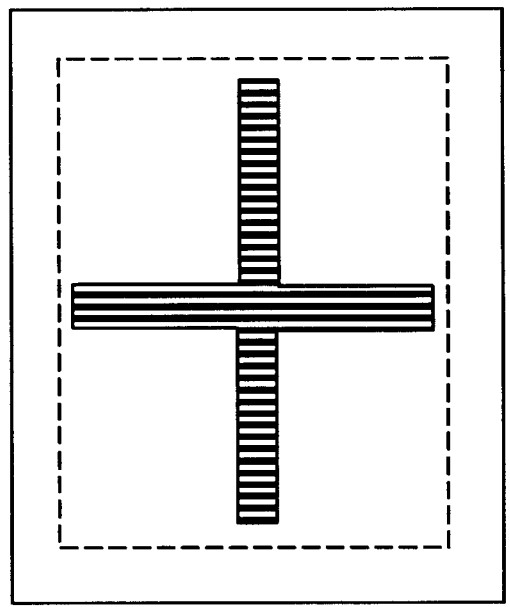
Figure 1:
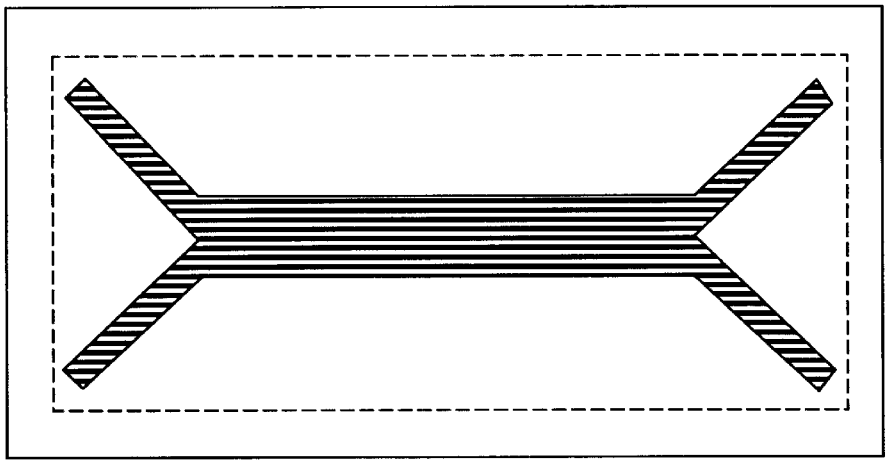
Figure 1:
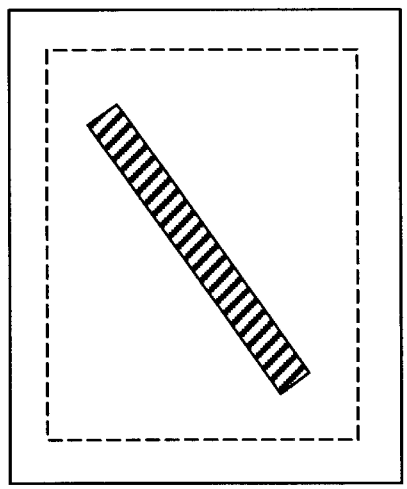
Figure 1:
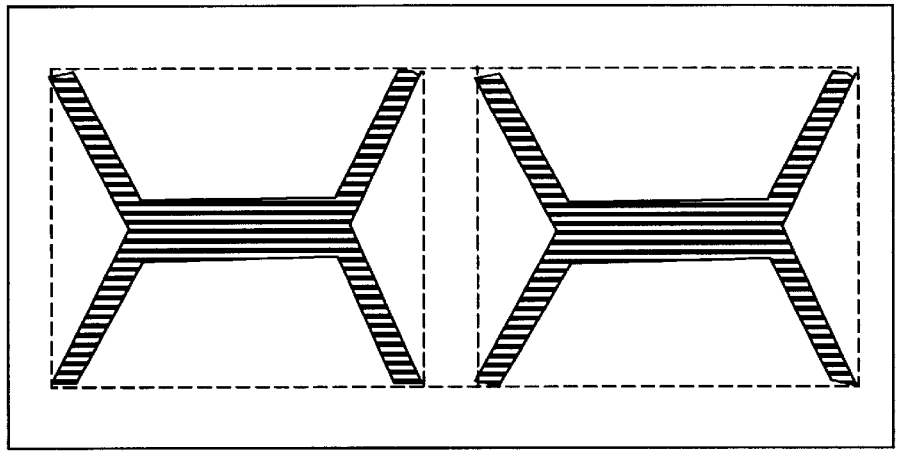
Figure 1:
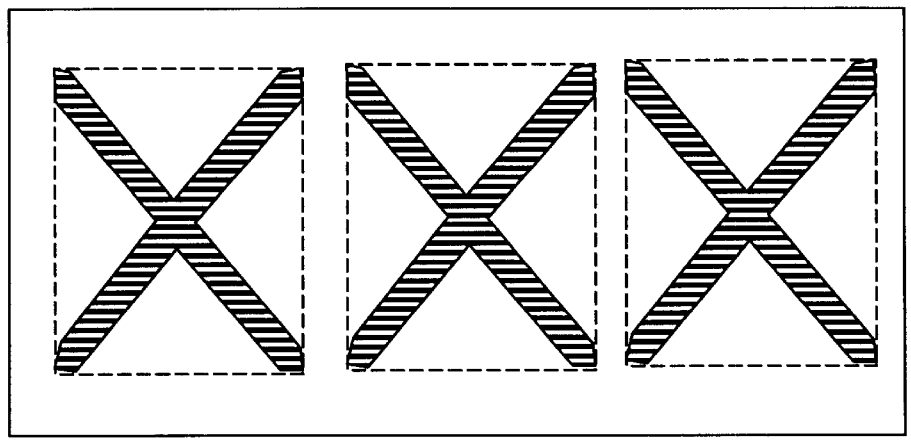
Figure 1:
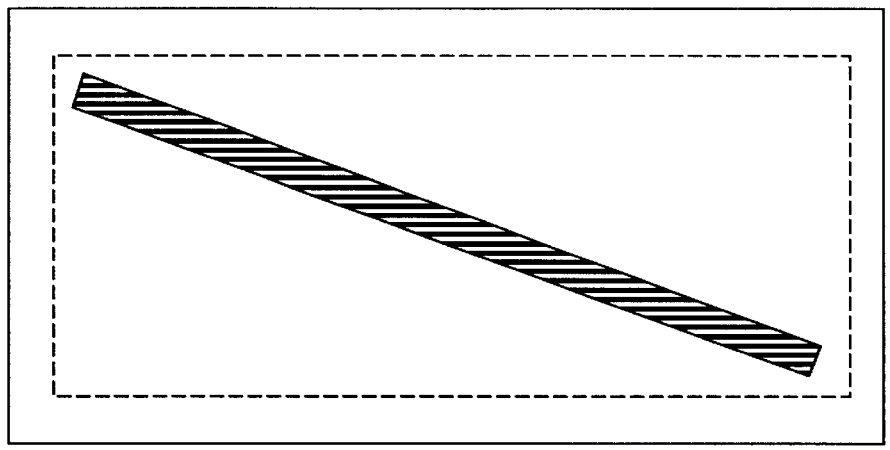
Figure 1:
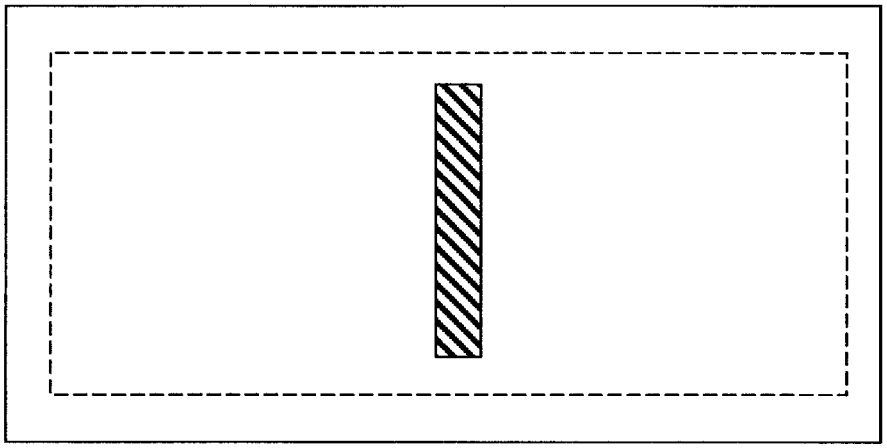
Figure 1:
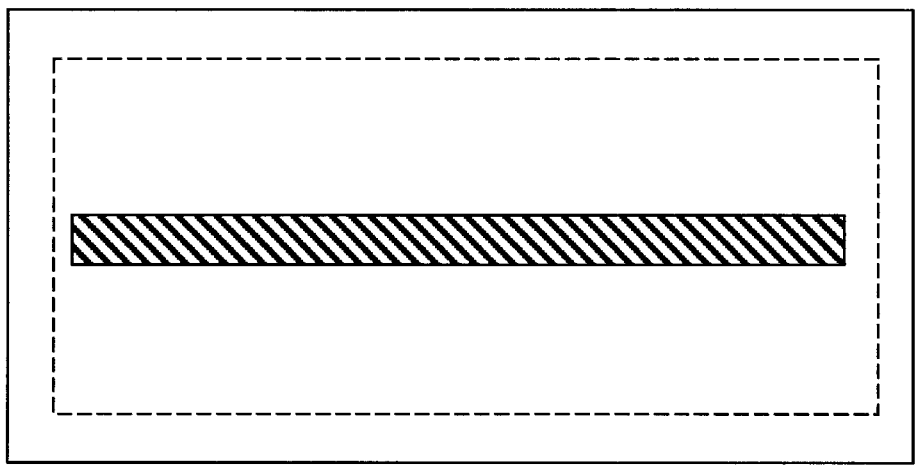
Figure 2:
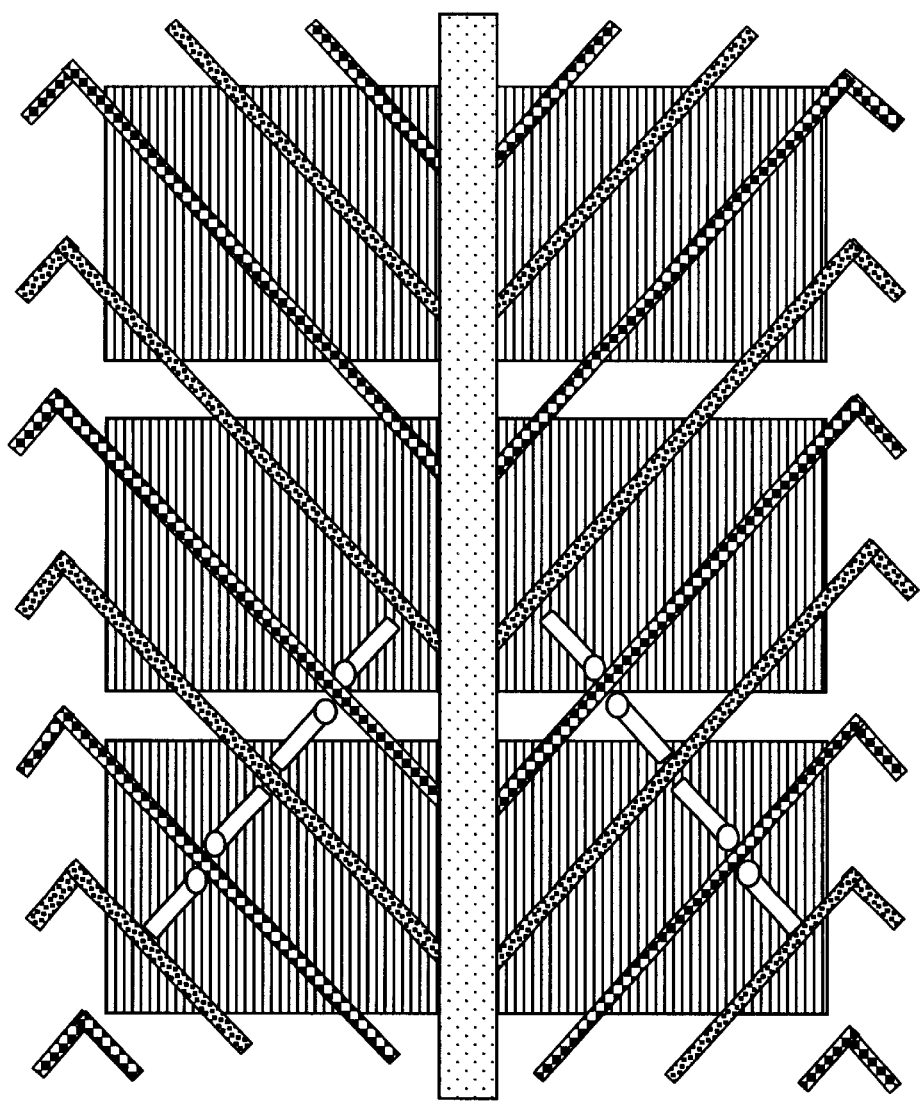
FIG. 2 shows a bump structure of a conventional multi-domain LCD.
Figure 3:
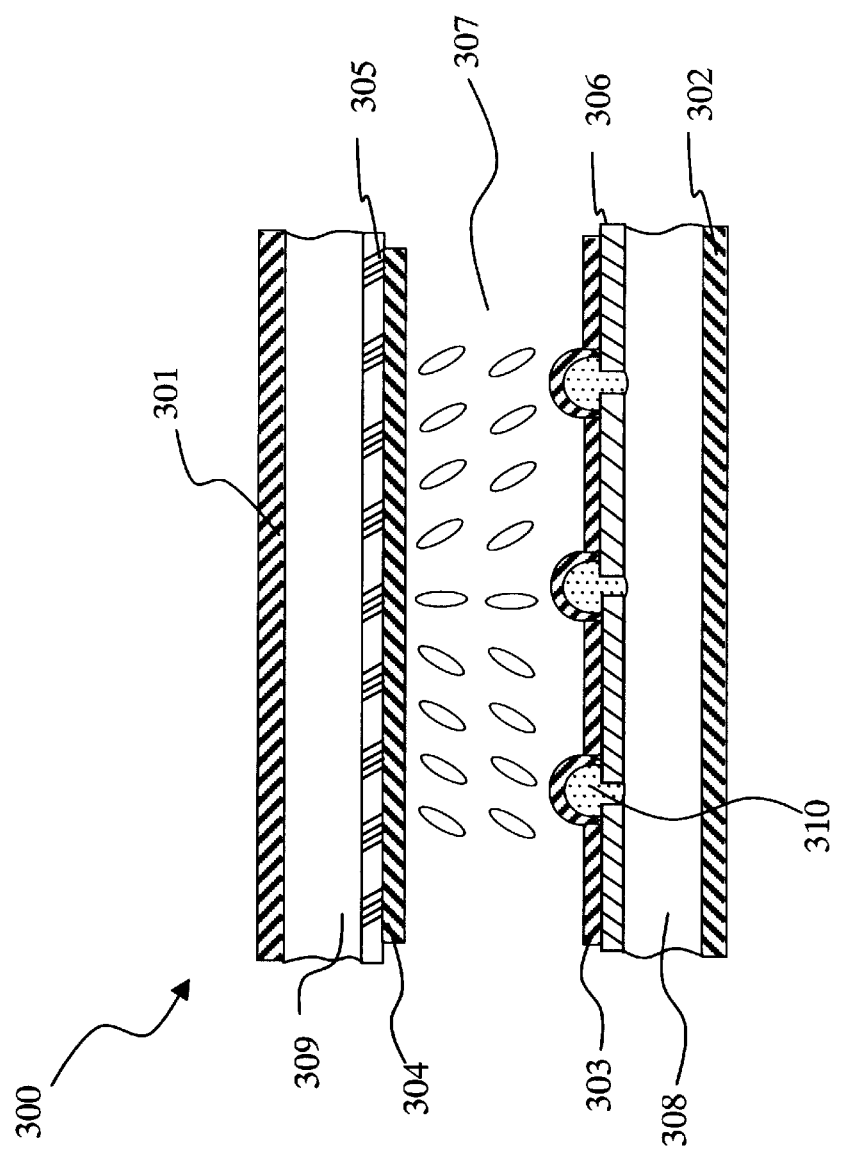
FIG. 3 is a cross-sectional view of a multi-domain LCD according to the invention.

FIG. 3 is a cross-sectional view of a multi-domain LCD according to the invention. Referring to FIG. 3, the LCD structure 300 comprises a liquid crystal cell, a pair of crossed polarizers 301 and 302, compensating films 303 and 304, and a wall-bump structure 310 having a plurality of wall-bumps. The liquid crystal cell comprises a pixel electrode layer 305, a common electrode layer 306 and a pair of parallel substrates 308 and 309. A liquid crystal material 307 fills the space between substrates 308 and 309. The exterior surfaces of the liquid crystal cell have respective crossed polarizers 301 and 302 disposed thereon. The compensating films 303 and 304 are applied between the crossed polarizers 301 and 302. Each wall-bump structure 310 is located at the central portion of a pixel and disposed on a common electrode in the common electrode layer 306 on the substrate 308. There is a gap between the wall-bump structure 310 and the electrode on the other substrate 309. The common electrode layer 306 is continuous except where the wall-bump structure is located.

The height of the wall-bump structure may range from 0.5 $\mu$m to 4 $\mu$m in the present invention. The compensating films can be combinations of negative birefrigence and uni-axial birefrigence, such as a C-plate and an A-plate or at least one bi-axial film.

The pixel electrode may be a pixel unit driven by a switching device of an active matrix. Its structure can be co-plane with, above, or below the active matrix. The switching device of the active matrix may be a thin film transistor made of amorphous silicon, single silicon, poly-silicon, or low temperature poly-silicon, or a. plasma address device.

In accordance with the invention, the wall-bump structure is formed on a substrate of a color filter or thin film transistors with multiple structure configurations. The wall-bump structure is fabricated by a standard photo-lithographic process. In general, the steps of forming wall-bump structures include substrate formation, photo-resist coating, exposure and development. No rubbing treatment is required in the manufacturing process. Therefore, the process of this invention has the advantages of being fast and clean without the problems of electric static damage and particle pollution.

The material for the wall-bump structure may be photo-resist including negative photoresist material and positive photoresist material. Negative photoresist material may be vinyl-cinnami-acid or rubber style, and positive photoresist material may be novolak-NQD style or chemical amplify style.

The wall-bump structure of the invention provides pre-tilted angles for liquid crystal molecules and results in orderly alignment of liquid crystal molecules to form multi-domain textures after an external voltage is applied. Also, the ratios among the sizes of different domains can be adjusted by adjusting the position of the wall-bump structure. The wall-bump structure on the electrodes determines the characteristics of the multi-domains for liquid crystal molecules of the display.

FIG. 4 to FIG. 11 show wall-bump structures on electrodes in the preferred embodiments of a multi-domain LCD according to the invention and are described below. The wall-bump structures on electrodes are disposed on the substrate of a color filter. The crossover region of a data line and a gate line, which are perpendicular to each other, defines a pixel of the LCD. For simplicity, no data lines or gate lines are shown in figures. The pixel may be shaped as quasi-rectangle, quasi-square or of mosaic arrangement. Typically the pixel size is chosen to have a 1:3 aspect ratio for a quasi-rectangular pixel. The pixel size may range from 3 $\mu$m to 350 $\mu$m on a side.

Figure 4:
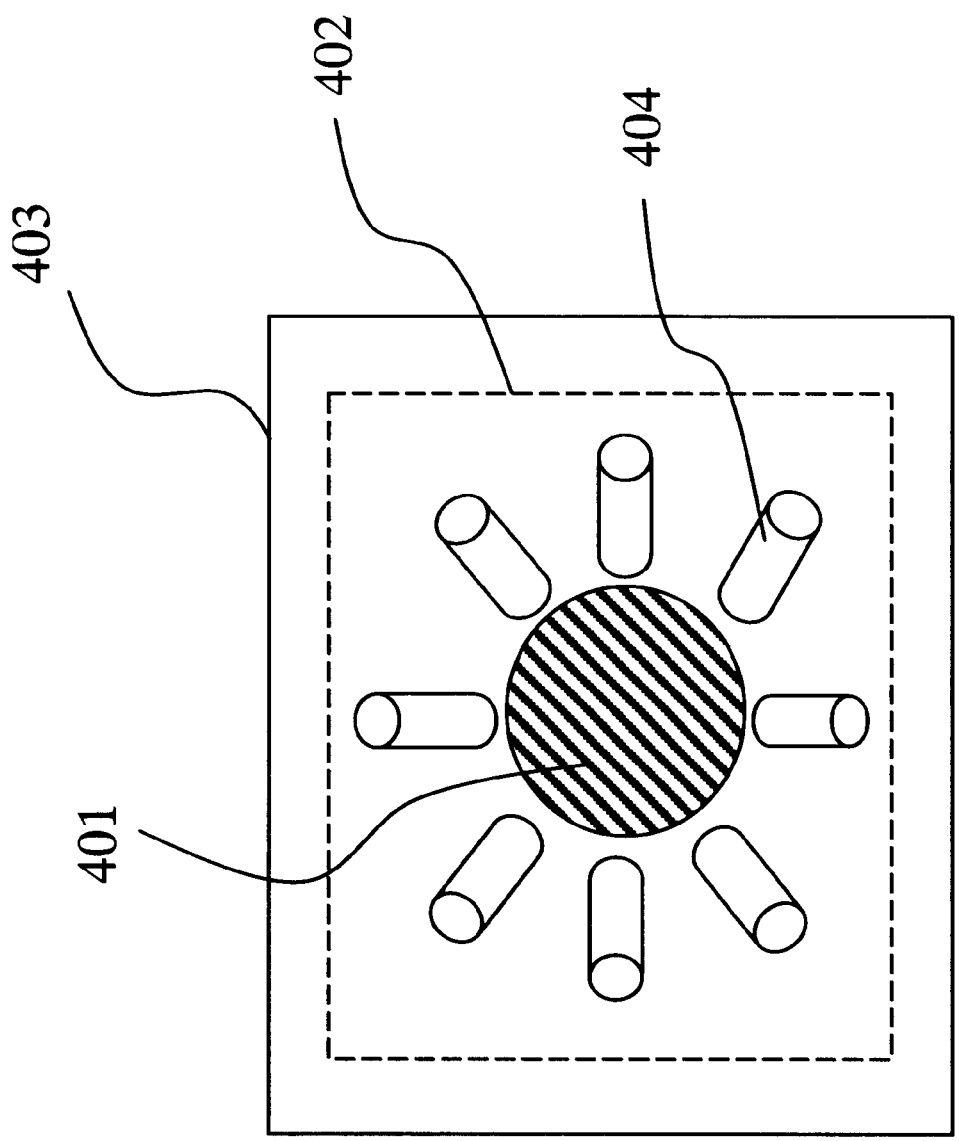
FIG. 4 shows a wall-bump structure on an electrode in a preferred embodiment of the multi-domain LCD according to the invention in which the pixels are of equal width and length and the wall-bump structure has a circular bottom shaped wall-bump.
Figure 5:
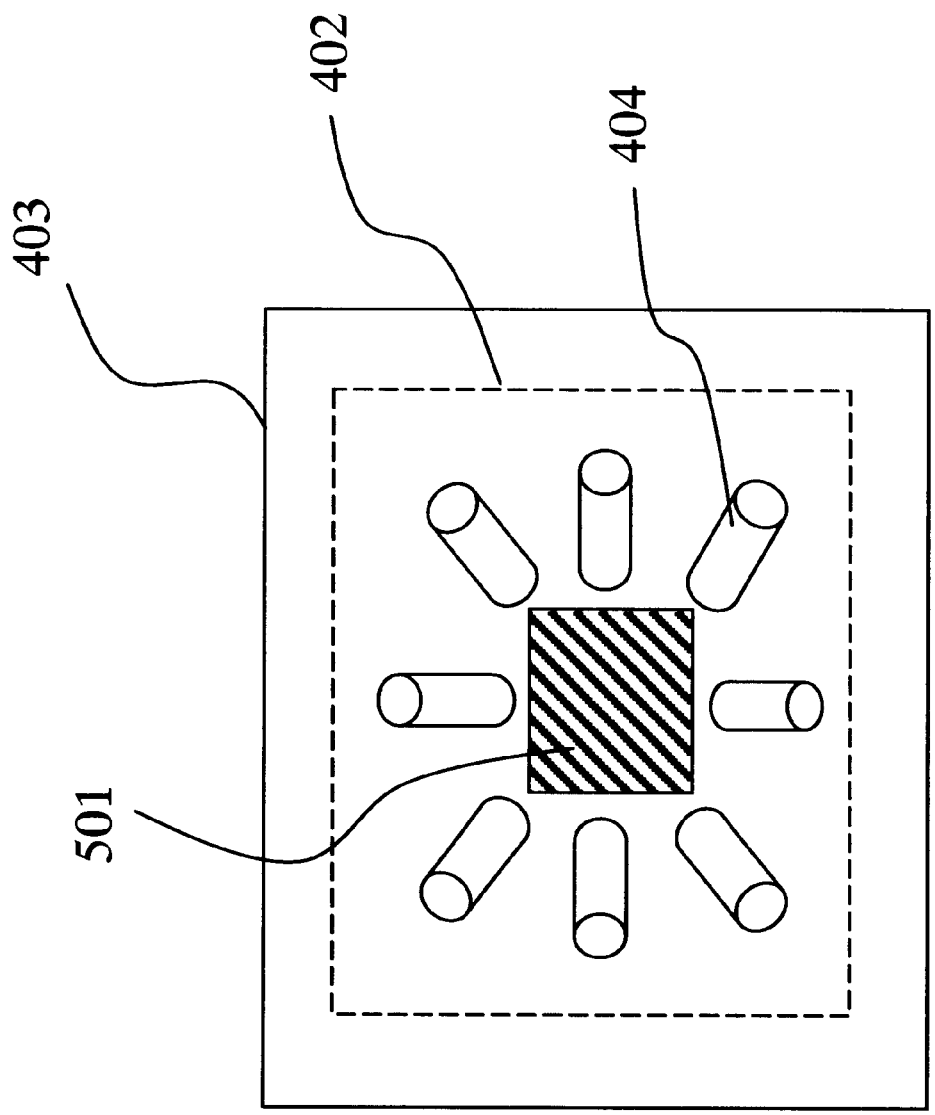
FIG. 5 shows a quasi-square bottom shaped wall-bump structure on an electrode according to the invention.
Figure 6:
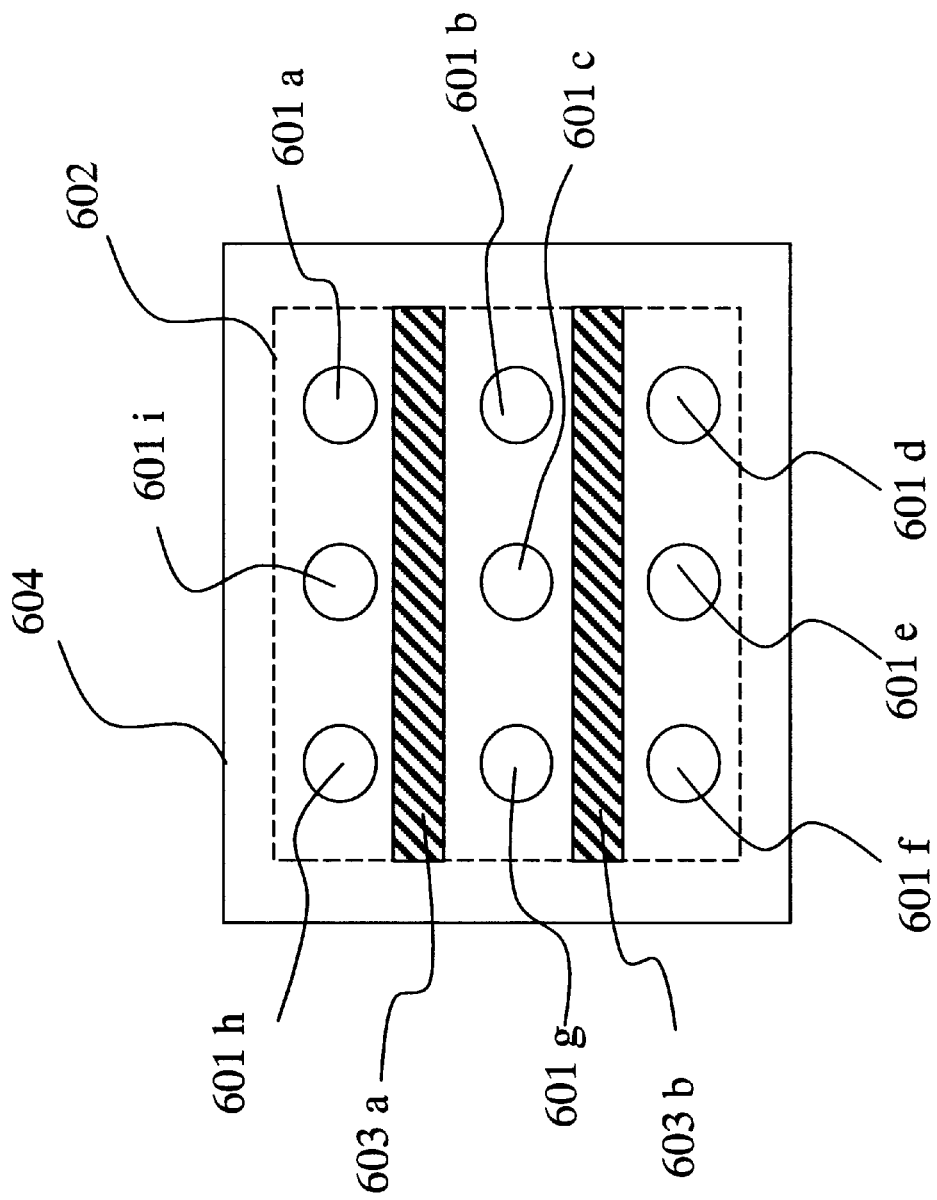
FIG. 6 shows a wall-bump structure that is a combination of multiple circular bottom shaped wall-bumps and two slot shaped wall-bumps according to the invention.

FIG. 4 to FIG. 6 show wall-bump structures on electrodes in the preferred embodiments of a multi-domain LCD according to the invention, where the pixels are of equal width and length. FIG. 4 shows a circular bottom shaped wall-bump structure. The circular bottom shaped wall-bump 401 is formed on an electrode 402 in the continuous common electrode layer on a single substrate. As shown in FIG. 4, the circular bottom shaped wall-bump 401 is located near the central portion of the pixel 403. Due to the combination effect of fringe fields produced by the common electrode layer and the circular bottom shaped wall-bump 401, liquid crystal molecules 404 are tilted in the direction toward the center of the circular bottom shaped wall-bump 401. Therefore, this disposition establishes a multi-domain LCD cell of multiple independent directions.

Similarly, the wall-bump structure shown in FIG. 5 is in quasi-square bottom shape. The bottom diameter of the circular bottom shaped wall-bump shown in FIG. 4 and the dimension of a side of the quasi-square bottom shaped wall-bump shown in FIG. 5 may range from 2 $\mu$m to 30 $\mu$m. The wall-bump structure may be asymmetric.

The wall-bump structure shown in FIG. 6 is a combination of multiple circular bottom shaped wall-bumps and two slot shaped wall-bumps. In this embodiment, nine circular bottom shaped wall-bumps 601a to 601i and two slot shaped wall-bumps 603a and 603b are formed on an electrode 602 in the continuous common electrode layer on a single substrate as shown in FIG. 6. This disposition divides the pixel 604 into several domains to form a multi-domain LCD cell of multiple independent directions. The wall-bumps 601a to 601i may also be replaced by quasi-square bottom wall-bumps.

FIG. 7 to FIG. 12 show wall-bump structures on electrodes in the preferred embodiments of a multi-domain LCD according to the invention, where the pixels are not of equal width and length. Typically the pixel size is chosen to have a 1:3 aspect ratio.

The wall-bump structure shown in FIG. 7(a) is a T-inverse-T shaped bump. In this embodiment, the T-inverse-T shaped bump 701 is formed on an electrode 702 in the continuous common electrode layer on a single substrate. As shown in FIG. 7(a), the T-inverse-T shaped bump 701 is located at the central portion of the pixel 704 with an elongated portion 703 being in parallel with the longer edge $L_1$ of the pixel The two ends of the T-inverse-T shaped wall-bump are parallel to the shorter edge $L_2$ of the pixel. This disposition divides the pixel 704 into four domains to form a multi-domain LCD cell of multiple independent directions.

As mentioned before, the ratios among the sizes of different domains can be adjusted by adjusting the position of the wall-bump around the central portion of the pixel. As shown in FIG. 7(a), $L_3$ and $L_4$ denote respective distances from the two ends of the T-inverse-T shaped wall-bump to the edge of the pixel 704. By adjusting the respective ratios of $L_3$ to $L_1$ and $L_4$ to $L_1$, the ratio between the sizes of the upper domain and the lower domain can be controlled. Also, the wall-bump structure may be asymmetric.

The width of the elongated portion of the T-inverse-T shaped bump 703, shown as dimension $W_1$, ranges from 0.5 $\mu$m to 10 $\mu$m and the length ranges from 0.5 $L_1$ to $L_1$ The width of the two parallel end portions, shown as dimension $W_2$, ranges from 0.5 $\mu$m to 10 $\mu$m and the length ranges from 0.5 $L_2$ to $L_2$ The T-inverse-T shaped wall-bumps shown in FIG. 7(b) and FIG. 7(c) are two asymmetric dispositions from FIG. 7(a). In FIG. 7(b) and FIG. 7(c), the non-transparent area labeled by label 705 or label 706 at the corner of a pixel is a thin film transistor, black matrix or capacity storage area.

Figure 8:
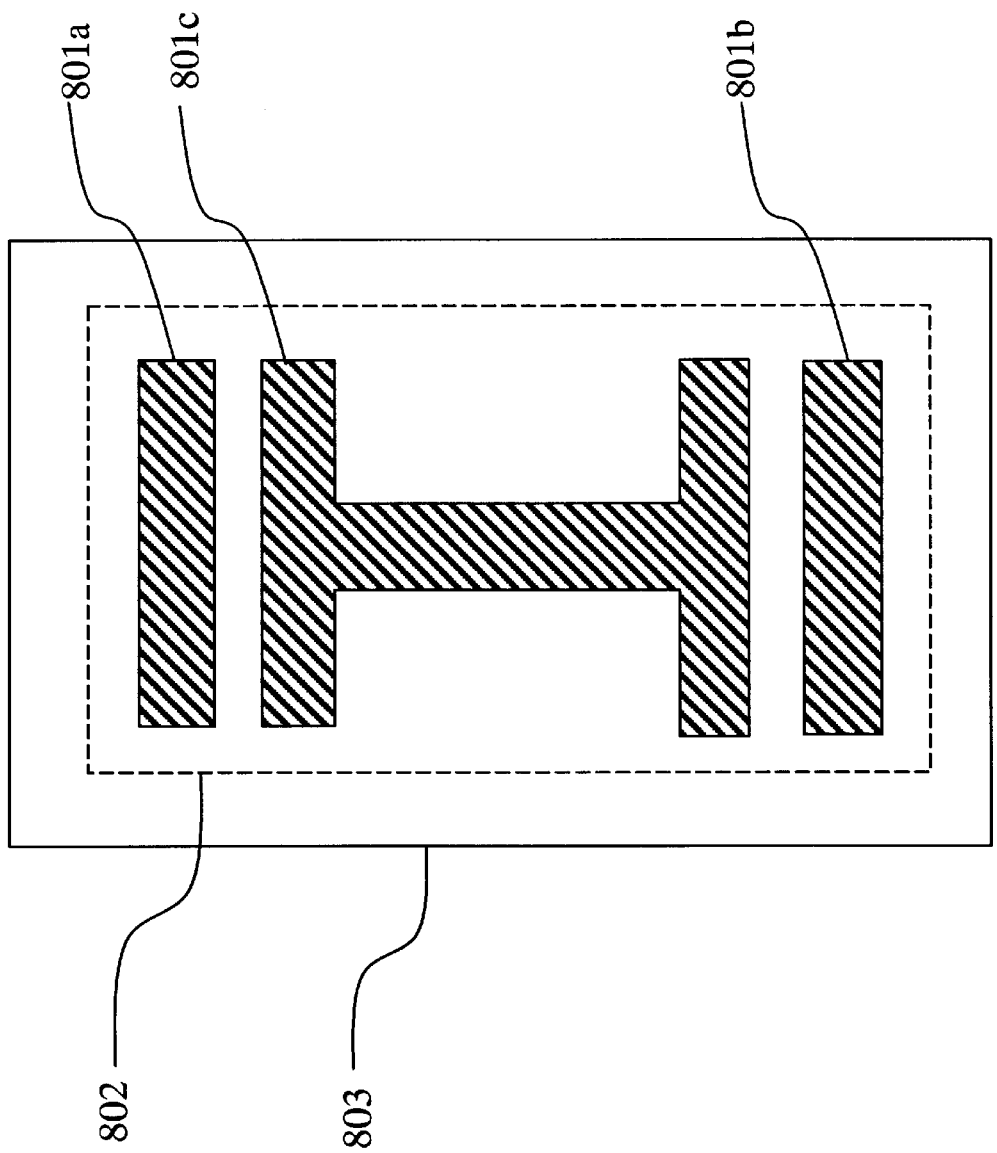
FIG. 8 shows a wall-bump structure on an electrode in a preferred embodiment of the multi-domain LCD according to the invention in which the pixels are not of equal width and length and the wall-bump structure comprises two horizontal slot shaped wall-bumps and a T-inverse-T shaped wall-bump.
Figure 9:
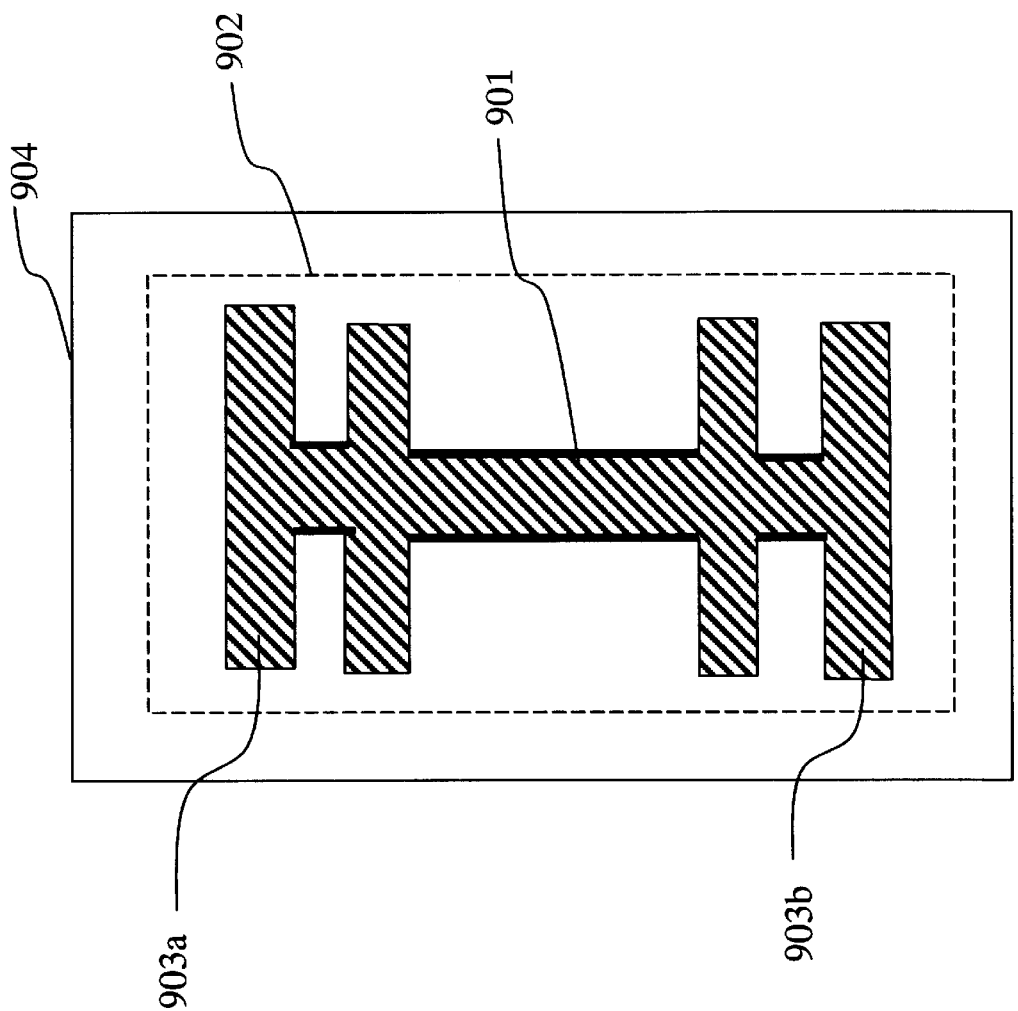
FIG. 9 shows a wall-bump structure similar to FIG. 8 but the elongated central portion of the T-inverse-T shaped wall-bump is extended to connect to the two horizontal slot shaped wall-bumps.

The wall-bump structures shown in FIG. 8 and FIG. 9 are two respective combinations of horizontal slot shaped wall-bumps and a T-inverse-T shaped wall-bump.

In the embodiment shown in FIG. 8, two slot shaped wall-bumps 801a and 801b and a T-inverse-T shaped bump 801c are formed on an electrode 802 in the continuous common electrode layer on a single substrate. As shown in FIG. 8, the T-inverse-T shaped bump 801c is located in the middle of the two slot shaped wall-bumps 801a and 801b that are parallel to the shorter edges of the pixel 803. This disposition divides the pixel 803 into several domains to form a multi-domain LCD cell of multiple independent directions.

In the embodiment shown in FIG. 9, the wall-bump structure is similar to that shown in FIG. 8 except that the central portion 901 of the T-inverse-T shaped bump is extended to connect the two horizontal slot shaped wall-bumps 903a and 903b. The wall-bumps are formed on an electrode 902 in the continuous common electrode layer on a single substrate as shown in FIG. 9. This disposition divides the pixel 904 into several domains to form a multi-domain LCD cell of multiple independent directions.

Figure 10:
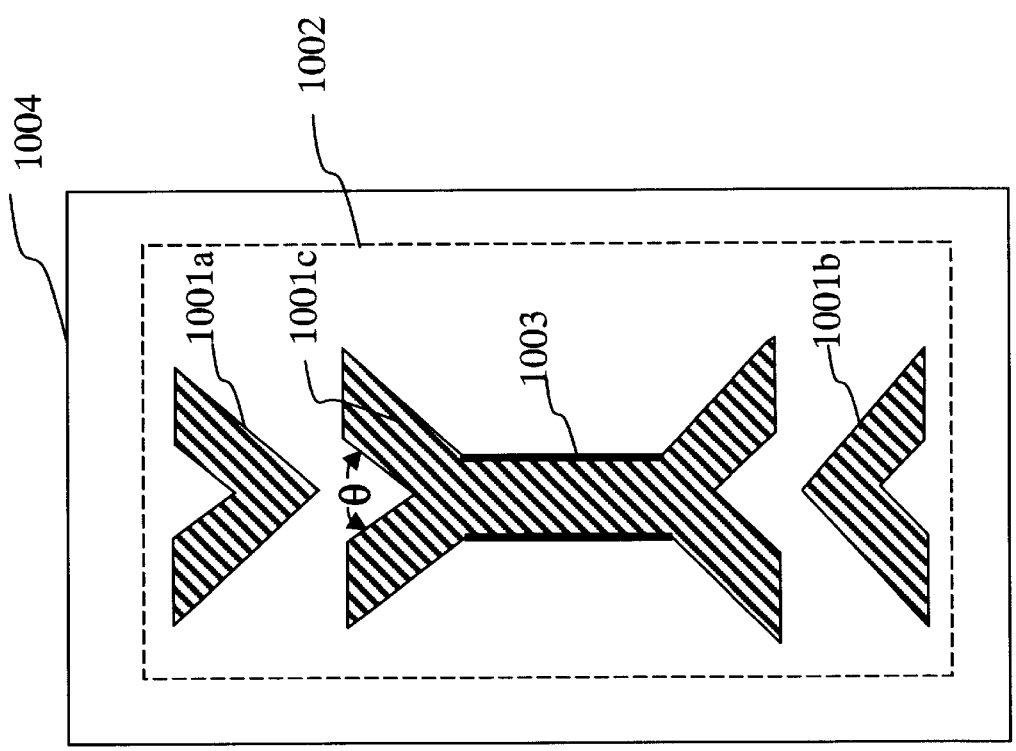
FIG. 10 shows a wall-bump structure on an electrode in a preferred embodiment of the multi-domain LCD according to the invention in which the pixels are not of equal width and length and the wall-bump structure comprises a plurality of V shaped wall-bumps and a V-inverse-V shaped wall-bump.
Figure 11:
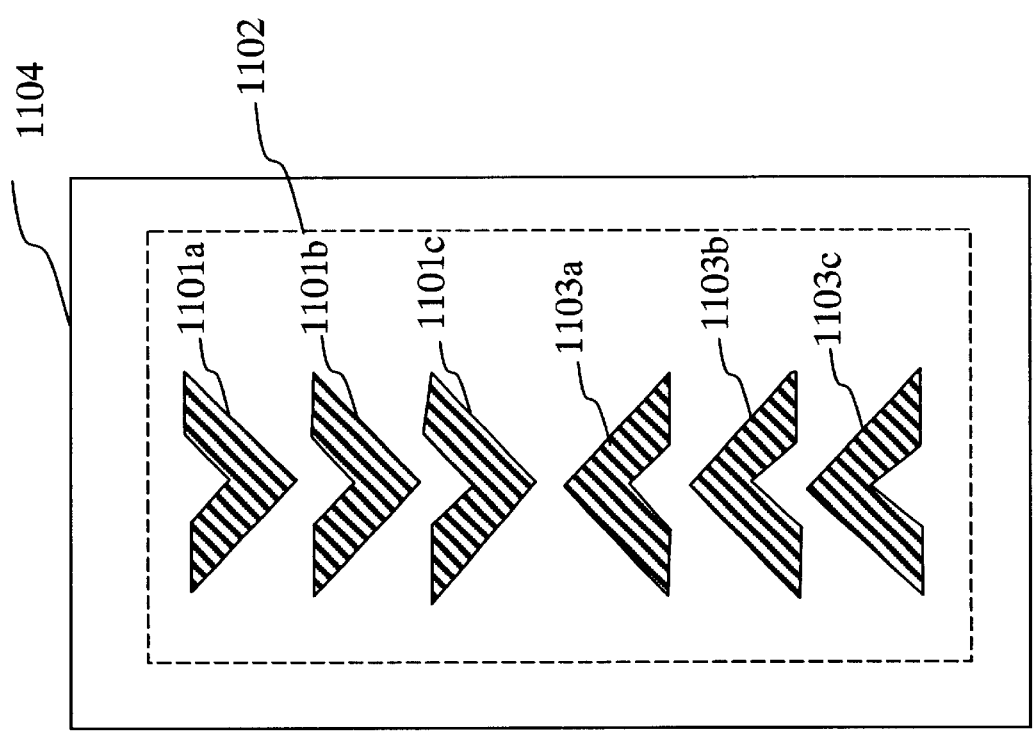
FIG. 11 shows a wall-bump structure on an electrode in a preferred embodiment of the multi-domain LCD according to the invention in which the pixels are not of equal width and length and the wall-bump structure comprises a plurality of V shaped wall-bumps and inverse V shaped wall-bumps.
Figure 12:
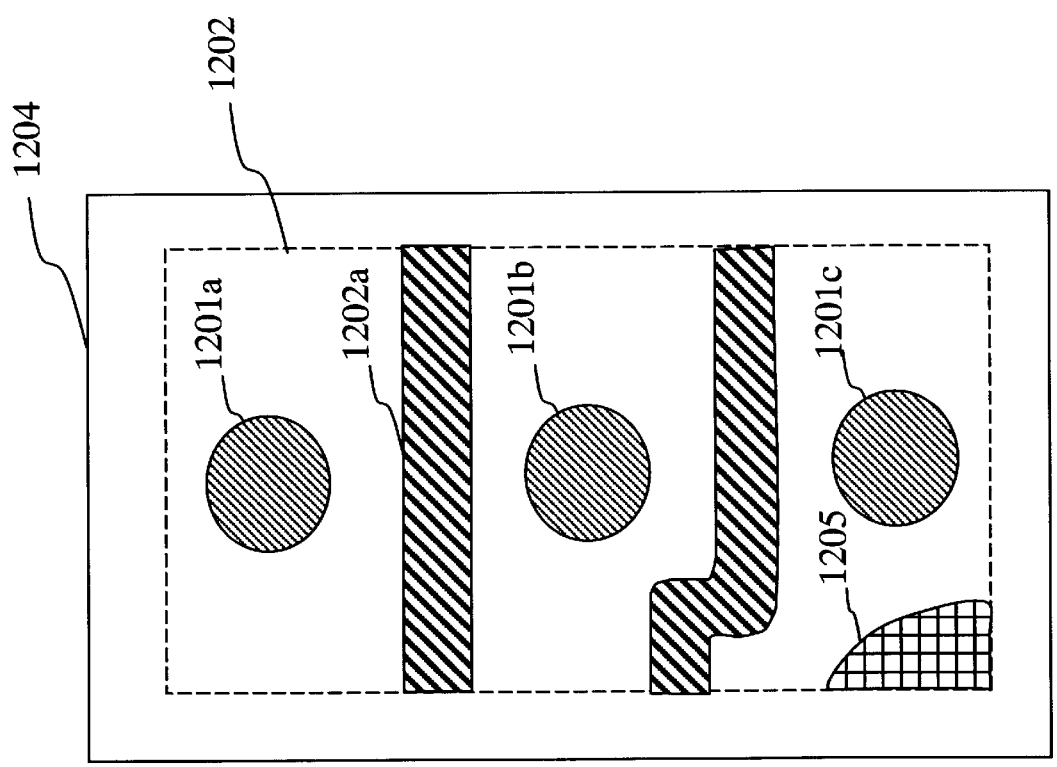
FIG. 12(a) shows a wall-bump structure on an electrode in a preferred embodiment of the multi-domain LCD according to the invention in which the pixels are not of equal width and length and the wall-bump structure comprises multiple circular bottom shaped wall-bumps and slot shaped wall-bumps.
FIG. 12(b) shows another wall-bump structure on an electrode in a preferred embodiment of the multi-domain LCD according to the invention in which the pixels are not of equal width and length and the wall-bump structure comprises multiple circular bottom shaped wall-bumps and slot shaped wall-bumps.
Figure 12:
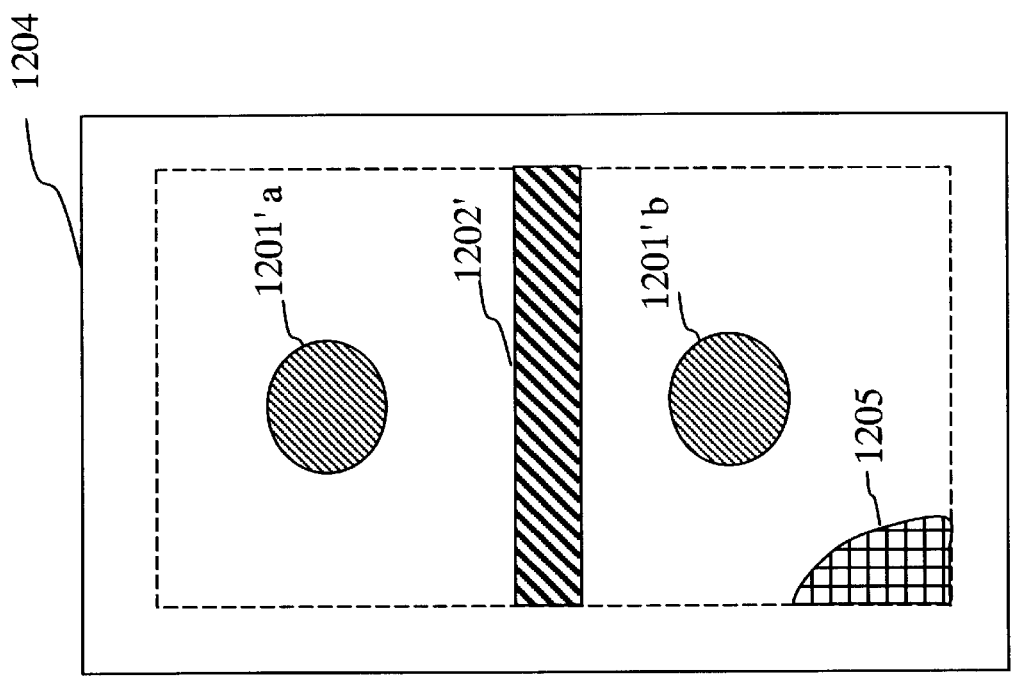

The wall-bump structures shown in FIG. 10 and FIG. 11 are two different combinations of multiple V shaped wall-bumps and a V-inverse-V shaped wall-bump. In the embodiment shown in FIG. 10, two V shaped wall-bumps 1001a and 1001b and a V-inverse-V shaped bump 1001c are formed on an electrode 1002 in the continuous common electrode layer on a single substrate. As shown in FIG. 10, the V-inverse-V shaped bump 1001c is located in the middle of the two V shaped wall-bumps 1001a and 1001b with the elongated central portion 1003 of the V-inverse-V shaped bump 1001c being parallel to the longer edge of the pixel 1004. The degree of the V angle $\theta_1$ may range from 80° to 100° and is preferably near 90° for best results as shown in FIG. 10. This disposition divides the pixel 1004 into several domains to form a multi-domain LCD cell of multiple independent directions.

In the embodiment shown in FIG. 11, the wall-bump structure is similar to that shown in FIG. 10 except that the central portion of the V-inverse-V shaped bump is replaced by V shaped bumps to form three V shaped bumps 1101a, 1101b and 1101c as well as three inverse-V shaped bumps 1103a, .1103b and 1103c as shown in FIG. 11. This disposition divides the pixel 1104 into several domains to form a multi-domain LCD cell of multiple independent directions.

The ratios among the sizes of different domains in the aforementioned FIG. 8 to FIG. 11 can be adjusted by adjusting the position of the wall-bump. Also, the wall-bump structure may be asymmetric.

The wall-bump structures shown in FIG. 12(a) and FIG. 12(b) are two different combinations of multiple circular bottom shaped wall-bumps and slot shaped wall-bumps. As shown in FIG. 12(a), three circular bottom shaped wall-bumps 1201a to 1201c and two slot shaped bumps 1202a and 1202b are formed on an electrode 1202 in the continuous common electrode layer on a single substrate. The comer labeled by label 1205 of the pixel 1204 is a non-transparent area. The wall-bump structure shown in FIG. 12(b) is a combination of two circular bottom shaped wall-bumps 1201'a and 1201'b and a slot shaped wall-bump 1202'. The wall-bump structures shown in FIGS. 12(a) and (b) may be asymmetric and the circular bottom may be replaced by a quasi-square bottom.

Figure 13:
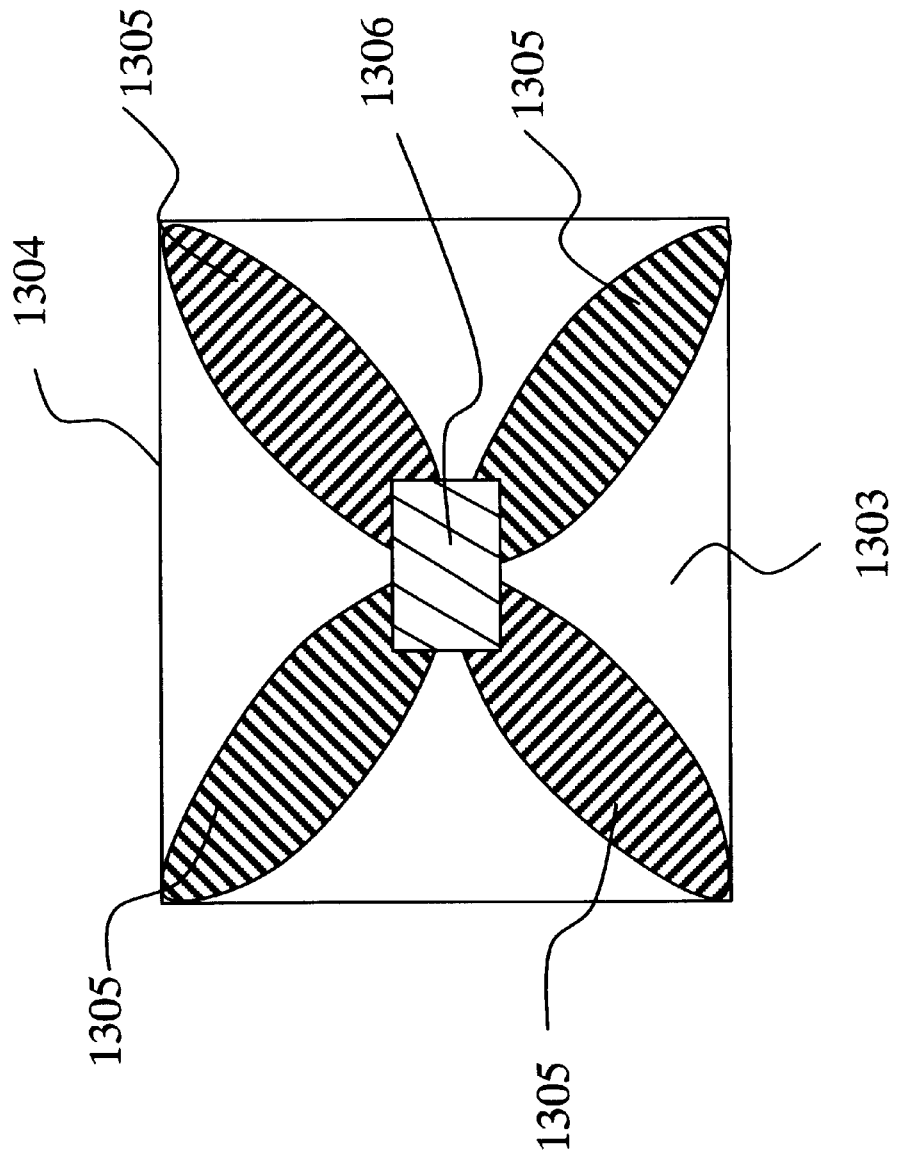
FIG. 13(a) shows the optical texture of the quasi-square bottom shaped wall-bump structure shown in FIG. 5 when the absorbing axes of the crossed polarizers of a multi-domain homeotropic aligned LCD of the present invention are placed at ±45° directions respectively, and a voltage is applied.
FIG. 13(b) shows the optical texture when the absorbing axes of the crossed polarizers are placed at 0° and 90° directions respectively, when a voltage is applied.
FIG. 13(c) shows that the optical texture is asymmetric when the wall-bump is far away from the center of a pixel.
Figure 13:
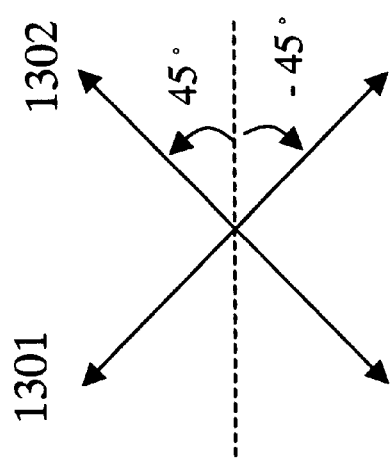
Figure 13:
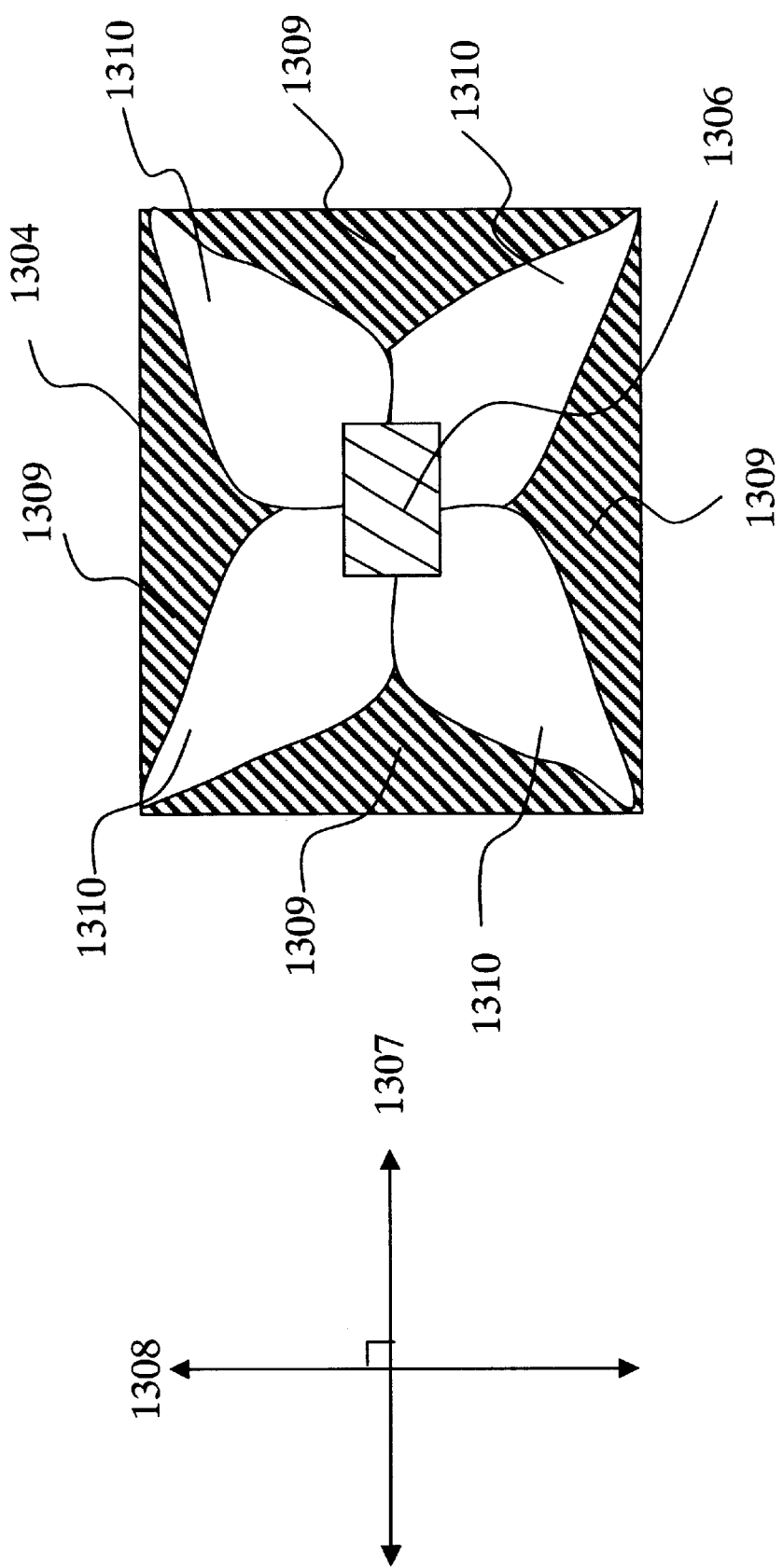
Figure 13:
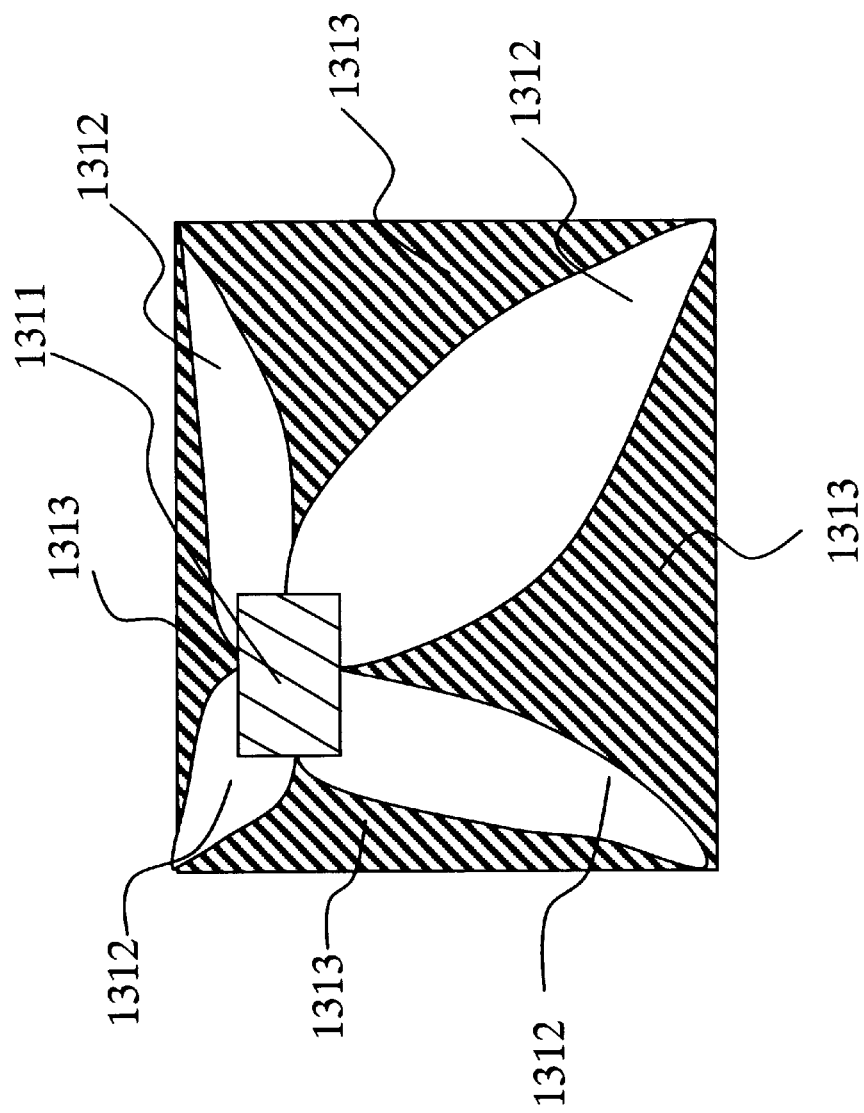
Figure 14:
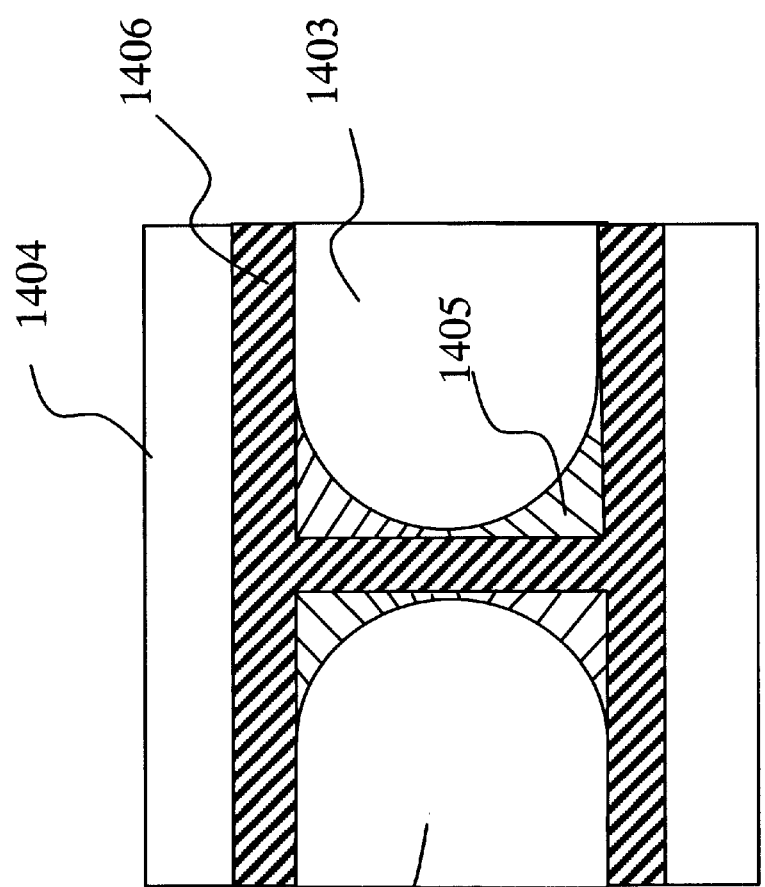
FIG. 14 shows the optical texture of the T-inverse-T shaped wall-bump structure shown in FIG. 7 when the absorbing axes of the crossed polarizers of a multi-domain homeotropic aligned LCD of the present invention are placed at ±45° directions respectively, and a voltage is applied.
Figure 14:
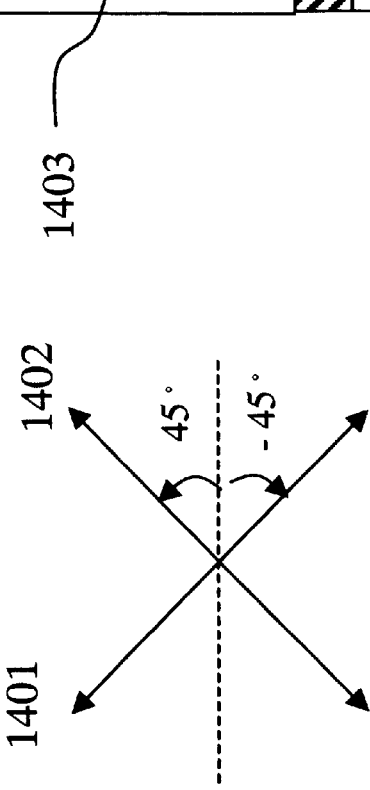

According to the invention, the tilt directions are determined by the combination effect of fringe fields and the bump structure. The light intensity is modulated by the crossed polarizers due to the field effect of liquid crystal directors. FIGS. 13 and 14 describe the optical textures of the wall-bumps when the absorbing axes of crossed polarizers of a multi-domain LCD of the present invention are placed at various directions, and a voltage is applied.

FIG. 13(a) shows the optical texture of the quasi-square bottom shaped wall-bump shown in FIG. 5 when the absorbing axes 1301 and 1302 of crossed polarizers of a multi-domain homeotropic aligned LCD of the present invention are placed at ±45° directions respectively, and a voltage is applied. The optical texture of the light transmitted region 1303 of the pixel 1304 changes from full dark to disclination texture 1305, when a voltage is applied, where the quasi-square bottom shaped wall-bump 1306 is located at the central portion of the pixel 1304. The optical texture can be changed by changing the orientation of the absorbing axes of crossed polarizers.

FIG. 13(b) shows the optical texture when the absorbing axes 1307 and 1308 of crossed polarizers are placed at 0° and 90° directions respectively, and a voltage is applied. The disclination texture 1309 is generated at the outer parts of the light transmitted region 1310 of the pixel 1304. In addition, the optical texture is more symmetric if the position of the wall-bump 1306 is closer to the center of the pixel 1304. Otherwise, the optical texture is asymmetric.

Referring to the optical texture shown in FIG. 13(c), when the wall-bump 1311 is far away from the center of the pixel 1304 and located toward the upper left corner of the pixel 1304, the light transmitted region 1312 also moves toward the upper left corner of the pixel. The optical texture becomes asymmetric.

Figure 7:
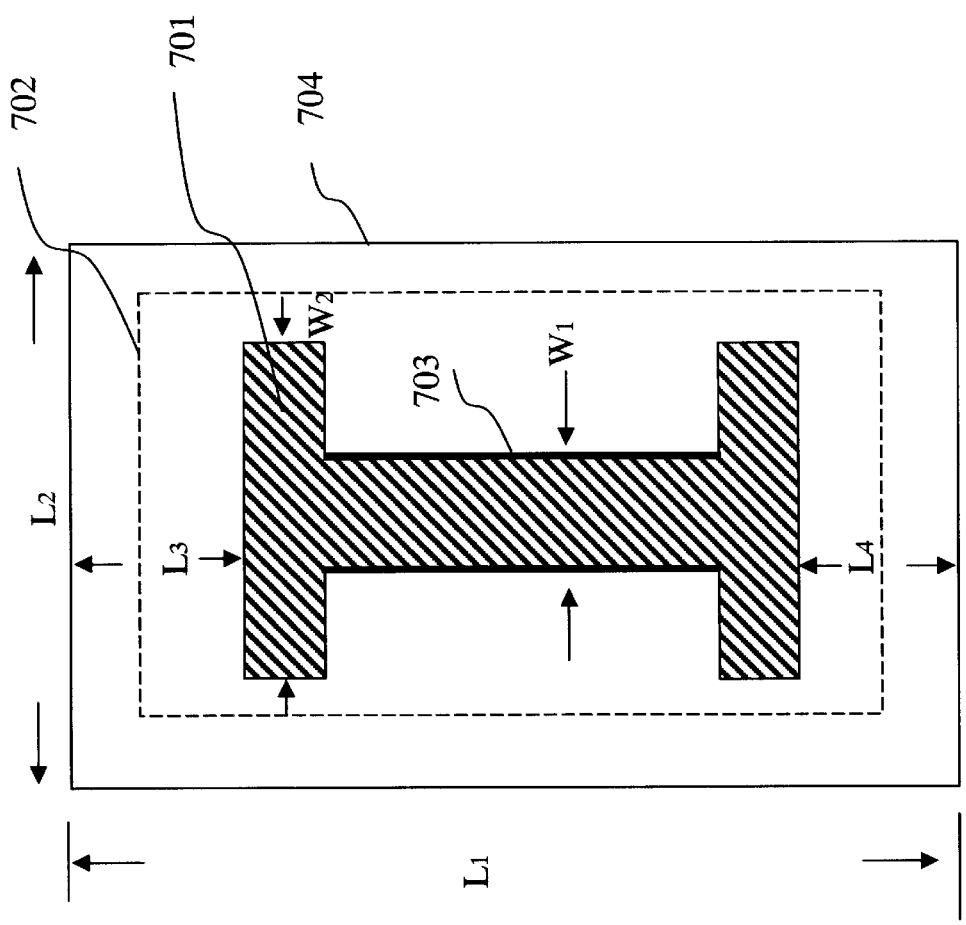
FIG. 7(a) shows a wall-bump structure on an electrode in a preferred embodiment of the multi-domain LCD according to the invention in which the pixels are not of equal width and length and the wall-bump structure has a T-inverse-T shaped wall-bump.
FIGS. 7(b)–7(c) show two asymmetric wall-bump structures of FIG. 7(a).
Figure 7:
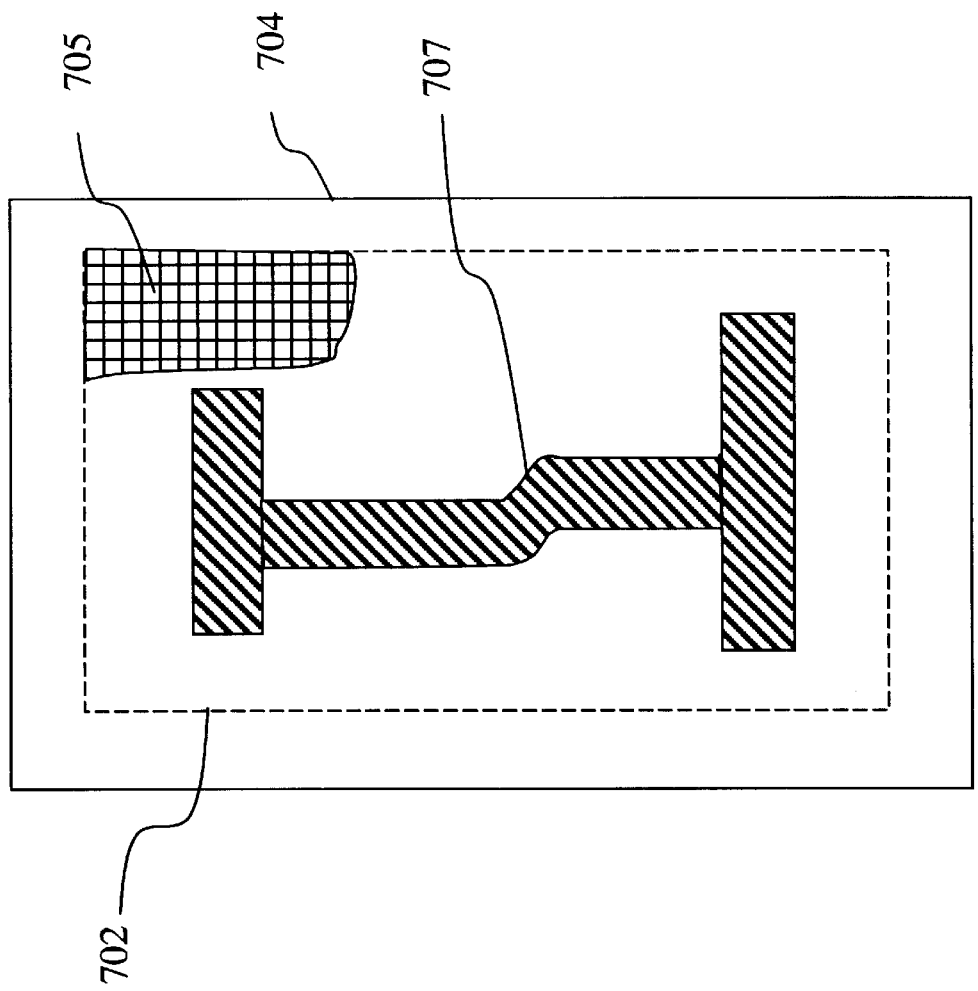
Figure 7:
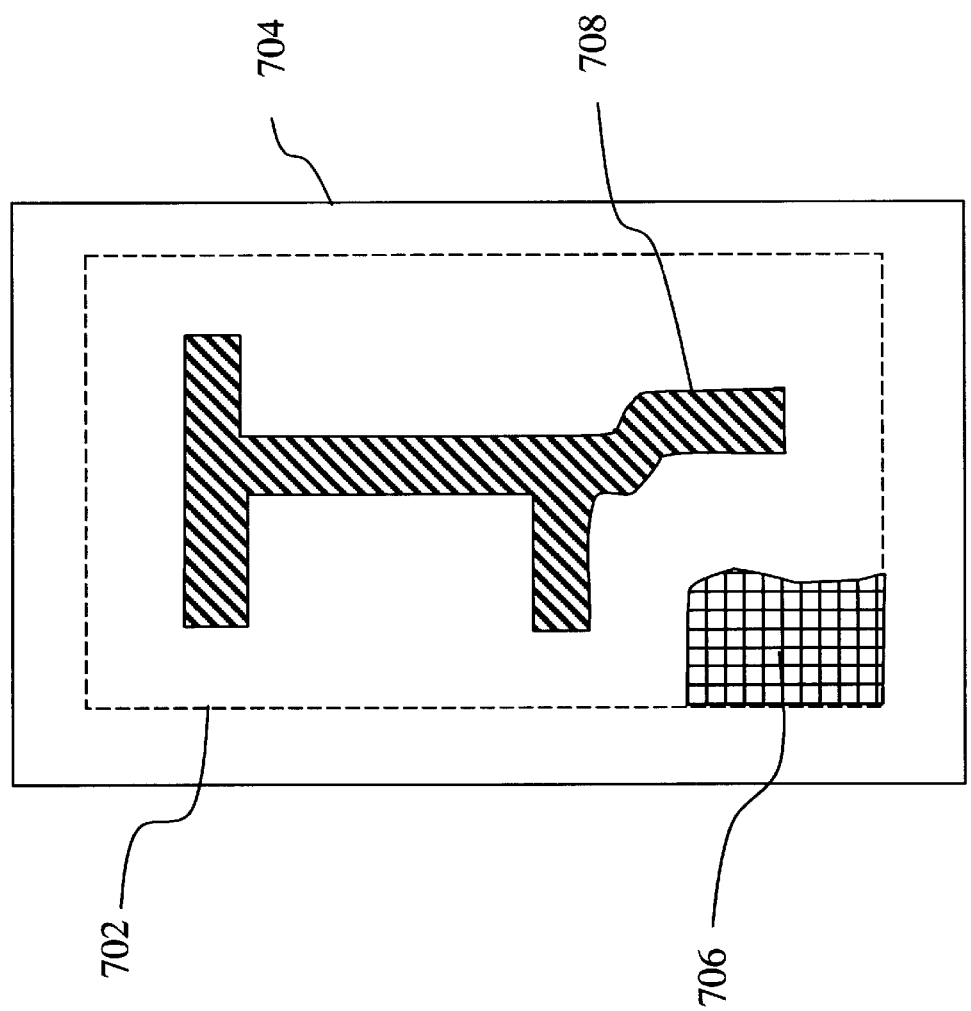

FIG. 14 shows the optical texture of the T-inverse-T shaped wall-bump shown in FIG. 7 when the absorbing axes 1401 and 1402 of crossed polarizers of a multi-domain homeotropic aligned LCD of the present invention are placed at ±45° directions respectively, and a voltage is applied. The optical texture of the light transmitted region 1403 of the pixel 1404 changes from full dark to disclination texture 1405, when a voltage is applied, where the T-inverse-T shaped wall-bump 1406 is located at the central portion of the pixel 1404.

In an embodiment of a mosaic arrangement with pixel-size of 127 $\mu$m long by 121 $\mu$m wide, wall-bumps with circular or quasi-square bottoms are formed on an 1.8 inch TFT substrate where the width of the wall-bump is 4 $\mu$m, the height of the wall-bump is 2 $\mu$m and the length is 15 $\mu$m. The response of a pixel is measured by switching the applied voltage from 0 and 5 volts. The total response time, the rise time plus the decay time, is about 18 ms which is fast enough for its applications.

The typical response time of a conventional 90°-twisted nematic LCD is about 40 ms.

Furthermore, T-inverse-T shaped wall-bumps are formed on an 1.8 inch TFT substrate with crossed polarizers where the dimensions of $L_1$, $L_2$, $L_3$ and $L_4$ are 133 $\mu$m, 67.5 $\mu$m, 35 $\mu$m, and 35 $\mu$m, respectively. The aperture ratio of the pixel in a multi-domain LCD of the invention is about 47%. The transmittance can reach up to 3% when a 5 volt voltage is applied. This is about 55% light intensity of a conventional 90°-twisted nematic LCD and 20% higher transmittance than a conventional vertically aligned wide-viewing angle LCD.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A multi-domain liquid crystal display comprising:

a liquid crystal cell having a first substrate with a plurality of pixel electrodes thereon, a second substrate with a common electrode layer thereon, and liquid crystals filling a space between said substrates;

a pair of crossed polarizers being disposed on exterior surfaces of said liquid crystal cell;

at least one compensating film being disposed between said crossed polarizers; and a plurality of wall-bump structures being disposed on one of said substrates, each wall-bump structure being located in a pixel area for forming more than one liquid crystal domain resulting from Singe field effect between a pixel electrode and a wall-bump structure in said pixel area;

wherein each pixel being substantially rectangular has a longer edge and a shorter edge, and each wall-bump structure comprises a plurality of circular bottom shaped wall-bumps and a plurality of slot shaped wall-bumps, said slot shaped wall-bumps being parallel to the shorter edge of a pixel.

2. A multi-domain liquid crystal display comprising:

a liquid crystal cell having a first substrate with a plurality of pixel electrodes thereon, a second substrate with a common electrode layer thereon, and liquid crystals failing a space between said substrates;

a pair of crossed polarizers being disposed on exterior surfaces of said liquid crystal cell;

at least one compensating film being disposed between said crossed polarizers; and a plurality of wall-bump structures being disposed on one of said substrates, each wall-bump structure being located in a pixel area for forming more than one liquid crystal domain resulting from fringe field effect between a pixel electrode and a wall-bump structure in said pixel area;

wherein each pixel being substantially rectangular has a longer edge and a shorter edge, and each wall-bump structure comprises a plurality of quasi-square bottom shaped wall-bumps and a plurality of slot shaped wall-bumps, said slot shaped wall-bumps being parallel to the shorter edge of a pixel.

3. A multi-domain liquid crystal display comprising:

a liquid crystal cell having a first substrate with a plurality of pixel electrodes thereon, a second substrate with a common electrode layer thereon, and liquid crystals filling a space between said substrates;

a pair of crossed polarizers being disposed on exterior surfaces of said liquid crystal cell;

at lcast one compensating film being disposed between said crossed polarizers; and a plurality of wall-bump structures being disposed on one of said substrates, each wall-bump structure being located in a pixel area for forming more than one liquid crystal domain resulting from fringe field effect between a pixel electrode and a wall-bump structure in said pixel area;

wherein each pixel being substantially rectangular has a longer edge and a shorter edge, and each wall-bump structure comprises two horizontal slot shaped wall-bumps and at least one T-inverse-T shaped wall-bump positioned between said two slot shaped wall-bumps, said two slot shaped wall-bumps being parallel to the shorter edge of a pixel, and said T-inverse-T shaped wall-bump having an elongated central portion being parallel to the longer edge of a pixel.

4. The multi-domain liquid crystal display as claimed in claim 3, wherein the elongated central portion of said T-inverse-T shaped wall-bump is extended to connect to said two slot shaped wall-bumps.

5. A multi-domain liquid crystal display comprising:

a liquid crystal cell having a first substrate with a plurality of pixel electrodes thereon, a second substrate with a common electrode layer thereon, and liquid crystals filling a space between said substrates;

a pair of crossed polarizers being disposed on exterior surfaces of said liquid crystal cell;

at least one compensating film being disposed between said crossed polarizers; and a plurality of wall-bump structures being disposed on one of said substrates, each wall-bump structure being located in a pixel area for forming more than one liquid crystal domain resulting from fringe field effect between a pixel electrode and a wall-bump structure in said pixel area;

wherein each pixel being substantially rectangular has a longer edge and a shorter edge, and each wall-bump structure comprises two V shaped wall-bumps and at least one V-inverse-V shaped wall-bump positioned between said two V shaped wall-bumps, said V-inverse-V shaped wall-bump having a central portion being parallel to the longer edge of a pixel.

6. The multi-domain liquid crystal display as claimed in claim 5, said V shaped wall-bumps having a V angle ranging from 80° to 110°.

7. A multi-domain liquid crystal display comprising:

a liquid crystal cell having a first substrate with a plurality of pixel electrodes thereon, a second substrate with a common electrode layer thereon, and liquid crystals filling a space between said substrates;

a pair of crossed polarizers being disposed on exterior surfaces of said liquid crystal cell;

at least one compensating film being disposed between said crossed polarizers; and a plurality of wall-bump structures being disposed on one of said substrates, each wall-bump structure being located in a pixel area for forming more than one liquid crystal domain resulting from fringe field effect between a pixel electrode and a wall-bump structure in said pixel area;

wherein each pixel is substantially rectangular, and each wall-bump structure comprises a plurality of V shaped wall-bumps and a plurality of inverse-V shaped wall-bumps.

* * * * *